UNITED STATES PATENT OFFICE.

HEINRICH CARO, OF MANNHEIM, GERMANY, AND ALFRED KERN, OF BASLE, SWITZERLAND, ASSIGNORS TO THE BADISCHE ANILIN AND SODA FABRIK, OF MANNHEIM, GERMANY.

MANUFACTURE OF YELLOW COLORING-MATTER.

SPECIFICATION forming part of Letters Patent No. 301,802, dated July 8, 1884.

Application filed April 10, 1884. (No specimens.)

*To all whom it may concern:*

Be it known that we, HEINRICH CARO, a subject of the Grand Duke of Baden, residing at Mannheim, in the Empire of Germany, and ALFRED KERN, a citizen of the Swiss Republic, residing at Basle, in the Canton of Basle, in Switzerland, have invented new and useful Improvements in the Manufacture of a Yellow Dye-Stuff or Coloring-Matter, of which the following is a specification.

This invention relates to a yellow dye-stuff or coloring-matter, which we term "Auramine," and which is produced from tetramethyl-diamido benzophenone by the action of ammonia.

In carrying out our invention, we take one part, by weight, of the above-said tetramethyl-diamido benzophenone, and mix the same intimately with about one part, by weight, of hydrochlorate of ammonia, (sal-ammoniac,) and with about one part, by weight, of dry chloride of zinc. We then heat the mixture thus obtained in a cast-iron enameled pan, under constant agitation, to a temperature of about 180° centigrade, or until the same has entered into fusion. Upon maintaining the heat at the said temperature for about three hours, the formation of the yellow coloring-matter gradually proceeds, until at last a semi-fluid "melt" of bronze-like appearance is obtained, which solidifies upon cooling. In order to separate the auramine thus produced, the result of the operation is broken up into small lumps and first washed with cold water until the excess of chloride of zinc has been removed and the coloring-matter begins freely to dissolve. The washed residue is then exhausted with about one hundred parts of hot water, and the solution thus obtained is mixed with about six parts, by weight, of common salt, and allowed to cool, when a crystalline precipitate of the coloring-matter will be produced, which is then filtered, pressed, and dried at a temperature of about 40° centigrade. A further purification may be effected by recrystallization from water, diluted alcohol, or other suitable solvent.

Auramine produced in the manner above described presents the following characteristics: When crystallized from water, it has the appearance of a pale-yellow crystalline powder, consisting of small glistening scales. By recrystallization from diluted alcohol it may be obtained in the shape of dark-yellow prismatic needles, reflecting a steel-blue color from their surface. It is soluble in cold water, and more readily so in alcohol or in hot water. The diluted solutions possess a lemon-yellow color and exhibit no fluoresence.

Auramine produced as above described is a double compound of chloride of zinc with the hydrochlorate of a strong organic base, which forms mostly well-crystallized yellow-colored salts with mineral and organic acids. The base itself is a colorless solid, soluble in ether and hydrocarbons, and capable of being precipitated from the yellow solutions of its saline compounds by the addition of caustic alkalies. Hydrochloric acid, when added in the cold to an aqueous solution of the coloring-matter, does not at first effect a change of color, but upon being boiled the yellow acid solution becomes quickly decolorized, owing to the regeneration of tetramethyl-diamido benzophenone and ammonia.

Auramine in alcoholic solution is slowly reduced by sodium amalgam. The colorless amido compound thus produced forms a colorless solution with acetic acid, which, upon being heated gradually, assumes an intense purplish-blue coloration, thereby indicating its decomposition into tetramethyl-diamido benzhydrol and ammonia.

According to the above-described properties of auramine the same is sufficiently characterized as a basic coloring-matter, which cannot be conveniently employed in the presence of strong acids, acid mordants, and reducing-agents. In neutral solutions it imparts a bright lemon-yellow color to animal fiber;

but it is principally useful for dyeing cotton which has received a tannin or other suitable mordant, either alone or in admixture with other basic colors—such as basic aniline colors.

What we claim as new, and desire to secure by Letters Patent, is—

As a new product, the yellow coloring-matter or dye-stuff hereinbefore described, which, when dissolved in alcohol and treated first with sodium amalgam and then with acetic acid and heat, is decomposed into tetramethyl-diamido benzhydrol and ammonia.

In testimony whereof we have hereunto set our hands in the presence of two subscribing witnesses.

HEINRICH CARO.
ALFRED KERN.

Witnesses for Heinrich Caro:
WILHELM FRICKER,
JOHANNES BÜTTNER.

Witnesses for Alfred Kern:
N. HUZI,
CHS. A. RICHTER.